June 14, 1949.  C. MENZIES  2,473,381
HEAT TREAT FURNACE
Filed May 8, 1946
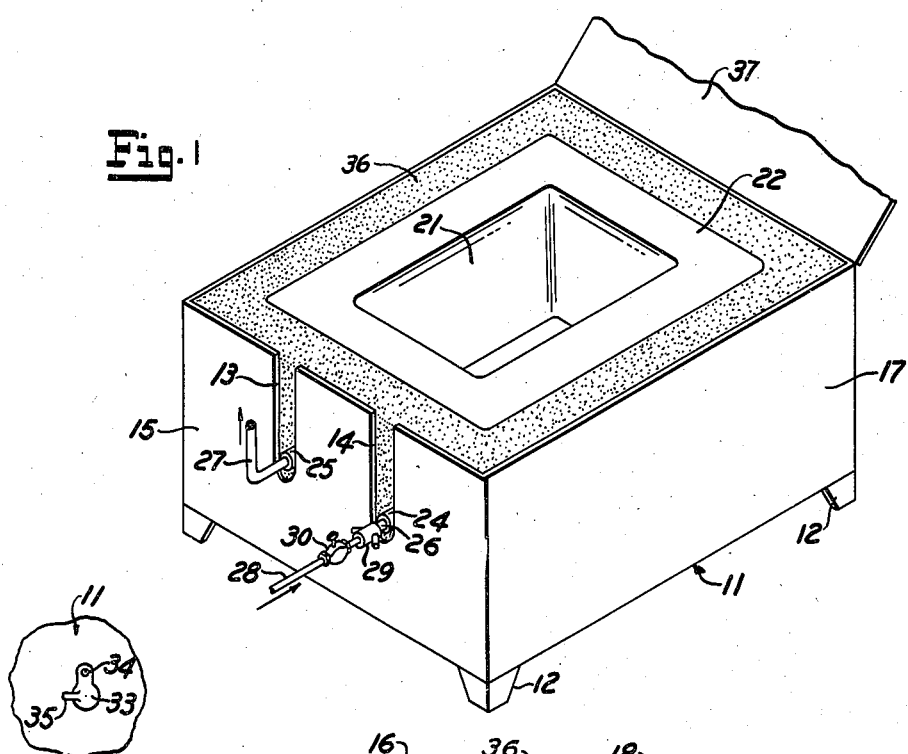
Fig. 1
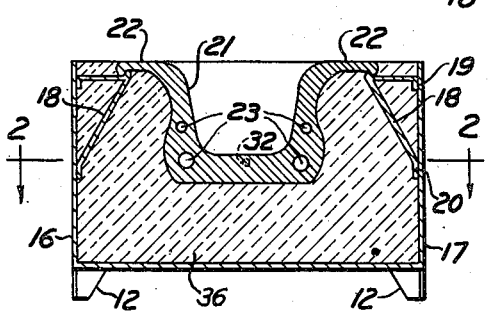
Fig. 4
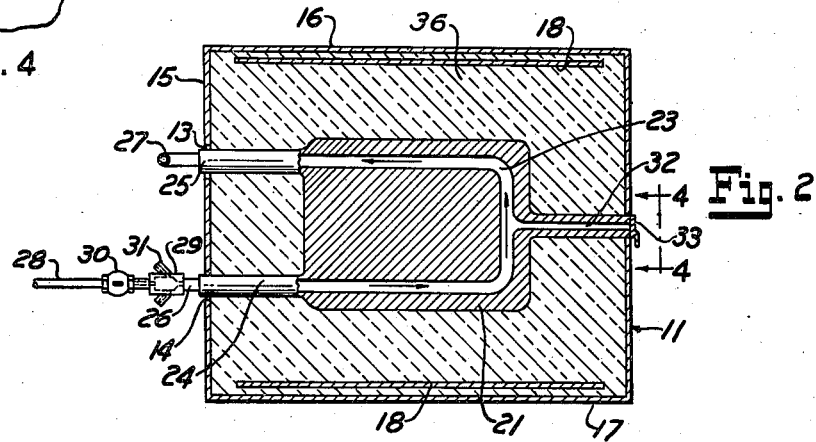
Fig. 2
Fig. 3
INVENTOR.
CLIFFORD MENZIES.
BY
Robert A. Sloman
ATTORNEY.

Patented June 14, 1949

2,473,381

UNITED STATES PATENT OFFICE 2,473,381

HEAT-TREAT FURNACE

Clifford Menzies, Detroit, Mich.

Application May 8, 1946, Serial No. 668,242

3 Claims. (Cl. 263—42)

This invention relates to heat treating furnaces, and more particularly to a radiant heated salt bath.

Heretofore various means have been employed for introducing heat to the furnace, or to the heat treating receptacle, all of which have been characterized by heat losses in transferring the source of heat to the heat treating receptacle.

It is therefore the object of this invention to provide a heat treating furnace, having a heat treating receptacle therein, with the source of heat introduced directly through portions of the receptacle.

It is the further object of this invention to provide a heat treating receptacle having a channeled opening, or a plurality of channeled openings provisioned therethrough, and through which a source of heat is projected.

These and other objects will be seen from the following specification and claims in conjunction with the appended drawing, in which:

Figure 1 is a perspective view of the heat treat furnace.

Figure 2 is a horizontal section thereof, taken on line 2—2 of Figure 3.

Figure 3 is an elevational section thereof; and

Figure 4 is a fragmentary elevational view on line 4—4 of Figure 2, showing the closure latch for a pilot opening.

It will be understood that the above drawing illustrates merely one preferable embodiment of the invention, and that other embodiments are contemplated within the scope of the claims hereafter set out.

Referring to the drawing, the heat treat furnace consists of the substantially cubical metallic hollow housing 11, with legs 12 and the two vertical slots 13 and 14, formed in one of the end walls 15.

Side walls 16 and 17 carry on the inner upper surfaces thereof, the two horizontal brackets 18, which are preferably welded thereto at points 19 and 20.

Hollow heat treating receptacle 21 has a peripheral horizontal flange 22 at its top portion, the side edges of which are adapted to be supported upon the top edges of brackets 18 for carrying said receptacle in a central position within housing 11.

As shown in Figures 2 and 3, receptacle 21 is cast with a hollow U-shaped channel portion 23, preferably circular in cross section, and which is positioned horizontally within the base of said receptacle.

Hollow pipes 24 and 25 are preferably joined to the ends of combustion channel 23 forming an integral part of receptacle 21. Combustible mixture intake pipe 26 is joined to pipe 24, and an exhaust pipe 27 joined to outlet pipe 25.

Referring to Fig. 2, pipes 24 and 25 project through the slotted openings 14 and 13, respectively, formed in end wall 15 of furnace housing 11. So arranged it is easy to lift receptacle 21 and pipes 24 and 25 from housing 11.

Burner fitting 29 is joined to the outer end of pipe 24. Gas intake pipe 28 from any suitable gas source preferably, joins the burner fitting 29 with hand valve 30 interposed. Hollow fitting 29 has a pair of angularly arranged hollow air intake pipes 31 so that a combustible mixture of air and gas is supplied to combustion chamber or channel 23 through burner fitting 29.

Chamber 23 is continuously supplied with a combustible mixture which burns throughout the length of said chamber. Any suitable ignition means may be employed, as for instance, through pilot tube 32 which forms a part of receptacle 21 and which extends from channel 23 out to the edge of furnace housing 11.

Latch 33, Figures 2 and 4, is pivotally mounted at 34 upon said housing to normally cover the opening in pilot tube 32. Handle 35 on latch 33 provides a means of pivoting the same to give access to said pilot tube. When said handle is released the latch falls by gravity into registry with the opening in the tube for closing the same.

The heat of combustion within channel 23 radiates throughout the heat treat receptacle for attaining the required temperature for the heat treating process desired, to which articles may be subjected within container 21. By the present arrangement there is practically no heat loss between the source of heat and said receptacle, whereby the maximum efficiency is attained.

It will be seen that a suitable heat insulating refractory material 36 is provided within hollow furnace housing 11, and interposed between said housing and receptacle 21, which is supported upon brackets 18 therein.

It is contemplated that a suitable cover 37 will be employed to provide a closure for furnace housing 11, as well as receptacle 21. Said cover may be loosely positioned over the top of housing 11, or hinged thereto if desired.

While a single channel 23 is preferable it is contemplated that a plurality of such channels could be formed within the walls of receptacle 21.

It will be noted that receptacle 21 is preferably cast with pipes 24 and 25 and pilot tube 32 as integral parts thereof. It will be understood that members 24, 25 and 32 could be separately attached to said receptacle if desired.

Having described my invention, reference should now be had to the claims which follow, for determining the scope thereof.

I claim:

1. A radiant heated furnace comprising a hollow housing, a heat treatment receptacle mounted within said housing in spaced relation, there being a hollow continuous U-shaped combustion channel formed within the base portion of said receptacle, a combustible mixture intake pipe joined to one end of said channel, and an exhaust pipe joined to its other end, said pipes projecting through openings formed within one of the walls of said housing and a pilot tube extending from and joined centrally to said combustion channel through which an ignition source may be introduced.

2. A radiant heated furnace comprising a hollow housing, a heat treatment receptacle mounted within said housing in spaced relation, there being a hollow continuous combustion channel formed within the base portion of said receptacle, an inlet pipe joined to said channel at one end for continuously introducing a combustible mixture thereto, an exhaust pipe at the other end thereof, and a pilot tube extending from and forming a part of said receptacle and joined centrally to said combustion channel through which an ignition source may be introduced.

3. A radiant heated furnace comprising a hollow housing, a heat treatment receptacle mounted within said housing in spaced relation, there being a hollow continuous combustion channel formed within the base portion of said receptacle, an inlet pipe joined to said channel at one end for continuously introducing a combustible mixture thereto, an exhaust pipe at the other end thereof, a pilot tube joined centrally to said combustion channel extending from and forming a part of said receptacle, through which an ignition source may be introduced, and a latch pivotally mounted on said housing normally registering with the opening in said pilot tube.

CLIFFORD MENZIES.

REFERENCES CITED

The following references are of record in the file of this patent:

UNITED STATES PATENTS

| Number | Name | Date |
|---|---|---|
| 2,017,229 | Beverley | Oct. 15, 1935 |
| 2,064,095 | Wilson | Dec. 15, 1936 |
| 2,091,980 | Hamlink | Sept. 7, 1937 |
| 2,106,505 | Morin | Jan. 25, 1938 |
| 2,174,052 | Woodson | Sept. 26, 1939 |
| 2,393,306 | Bonsack | Jan. 22, 1946 |